No. 673,900. Patented May 14, 1901.
D. H. DARLING, Jr.
ELECTRIC BATTERY.
(Application filed Oct. 11, 1899.)
(No Model.)

Witnesses
Edward C. Rowland.
M. J. Keating

Inventor
David H. Darling Jr
By his Attorney
Charles J. Kintner

UNITED STATES PATENT OFFICE.

DAVID H. DARLING, JR., OF NEW YORK, N. Y., ASSIGNOR TO THE UNITED STATES BATTERY COMPANY, OF SAME PLACE.

ELECTRIC BATTERY.

SPECIFICATION forming part of Letters Patent No. 673,900, dated May 14, 1901.

Application filed October 11, 1899. Serial No. 733,274. (No model.)

*To all whom it may concern:*

Be it known that I, DAVID H. DARLING, Jr., a citizen of the United States, residing at New York, borough of Brooklyn, county of Kings, and State of New York, have made a new and useful Invention in Electric Batteries, of which the following is a specification.

My invention is directed particularly to an improvement in electrical storage batteries, although many of the features thereof may be applied to primary electrical batteries in which liquid electrolytes are used; and it has for its objects, first, to provide means for effectually sealing a battery-cell so that the electrolyte or liquid cannot escape and so that at the same time any gases generated therein may escape, and, second, to so construct the containing jar or vessel of a single piece of material and in such manner that all of the parts of the battery will be securely held in position under all conditions of usage.

My improvement will be fully understood by referring to the accompanying drawings, in which—

Figure 1:
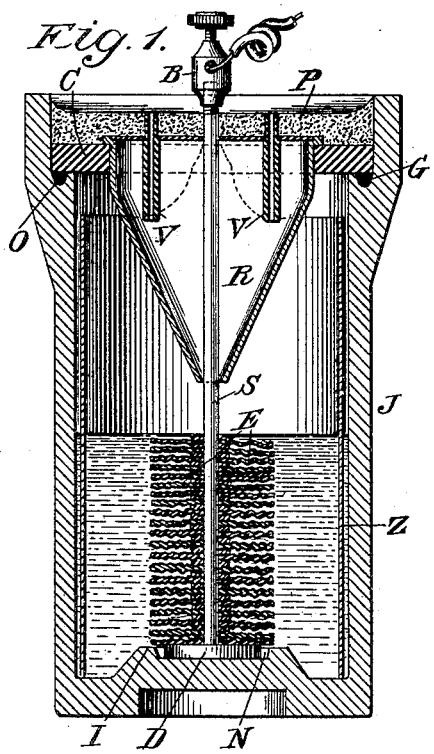
Figure 3:
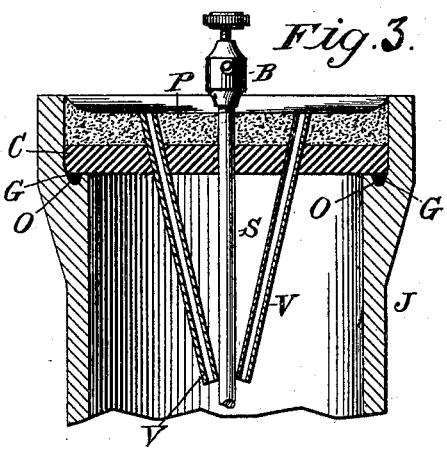
Figure 4:
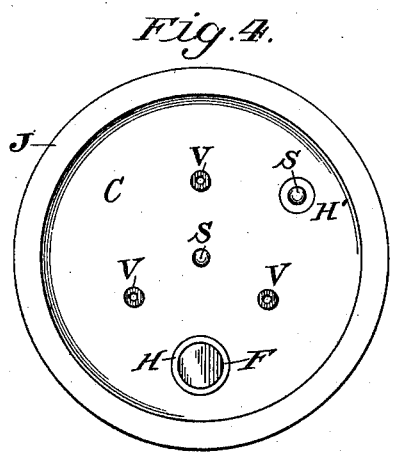
Figure 2:
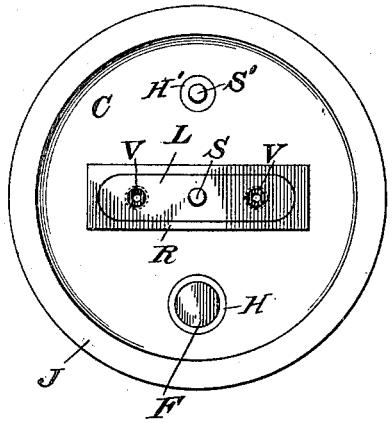
Figure 5:
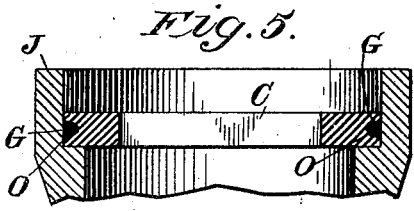
Figure 6:
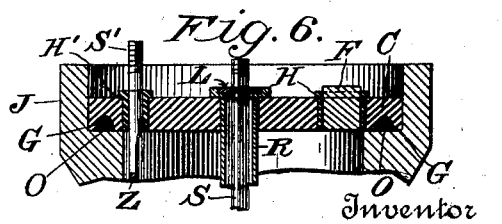

Figure 1 is a vertical sectional view taken through the body of one of my novel battery-cells. Fig. 2 is a plan view thereof as seen looking at Fig. 1 from the top toward the bottom of the drawings, the binding-post and sealing material shown in Fig. 1 being removed. Fig. 3 is a sectional view of a modified form of my improvement; and Fig. 4 is a plan view thereof as seen looking at Fig. 3 from the top toward the bottom of the drawings, the binding-post and sealing material shown in Fig. 3 being removed. Fig. 5 is a sectional view of the upper end of a containing jar or vessel, illustrating a modified manner of applying the means for preventing the short-circuiting of the electrodes; and Fig. 6 is a similar sectional view of a still further modification, illustrating also the manner of securing the conducting-standards of the electrodes, together with the filling-tube and its inclosing cork or stopper.

Prior to my improvements attempts had been made by others to devise battery-cells having means for preventing the escape of the liquid and also for allowing of the escape of any gas which may accumulate therein; but so far as I am aware no one has yet devised a cell which will effectually accomplish these results, and the chief object of my improvement is to provide such means. I effect these results by making the battery-cell of larger capacity than would be actually needed for use in connection with a definite amount of the electrolyte or exciting liquid and so arrange the sealing and vent tubes in the upper end thereof that when it—the cell— is turned upon its side or upside down no liquid can escape, and at the same time there is a free escape for all gases which may be generated within the cell.

Referring now to the drawings in detail for a full and clear understanding of the invention, such as will enable others skilled in the art to which it appertains to construct and use the same, and first to Fig. 1, J represents the containing jar or vessel, which I prefer to make of such size as to have a containing capacity considerably larger than the amount of electrolyte or liquid actually used. I have illustrated in the drawings such a jar and the amount of electrolyte or exciting liquid sufficient to fill it about half full. This jar is molded or blown preferably of a single piece of glass and is enlarged at its upper end, so as to leave a shoulder and a groove G for receiving a sealing cover or cork C, the groove being designed to secure in place a definite amount of an adhesive material O not affected by the electrolyte and for preventing the creeping of the liquids and in such manner, therefore, as to avoid short-circuiting action. The material which I prefer to use in this connection is composed of resin, beeswax, and turpentine mixed in such proportions as to give the desired consistency. No especial novelty is claimed for this material, however, as any material, such as paraffin-oil, may be substituted therefor.

The bottom of the cell in its interior is provided with an upward extension I, which is depressed, as shown at N, for the purpose of receiving the lower end of the electrode E, composed in the present instance of a lead disk D and standard S, upon which is threaded a number of lead disks separated from each other by lead washers. To the upper end of the standard S is attached one of the binding-posts B. Z constitutes the other electrode, consisting of a cylinder of rolled zinc properly amalgamated and fitting snugly within the inner surface of the jar J, its upper end being connected, as shown in dotted lines in Fig. 1, to a standard S' (see Fig. 2) in the rear of the standard S, the usual binding-post (not shown) being attached to said standard S'. Although I have described specifically the type of electrodes I prefer to use, any other well-known electrodes may be substituted therefor.

A sealing cover or cork C is provided with three openings, (see Fig. 2,) in two of which are placed hard-rubber rings H and H', the former constituting a filling-tube and the latter means of support for the rear conducting-standard S'. In the middle of the cover or cork is located an oblong opening in which is tightly fitted an oblong funnel-shaped sealing-tube R, extending downward, when the cork is in position, into the jar, said tube being provided with a shoulder around its upper end for securing it tightly within the cover or cork and its lower end having an interior diameter slightly greater than that of the standard S and located near the axial center of the cell.

L represents a removable cap or cover for the tube R, said cap being provided with two small vent-tubes V V, so arranged that when the cap is in position the long ends of the tubes will extend downward into the tube R and their short ends will extend outward, so as to permit the cell to be effectually sealed with a layer of adhesive wax P.

F represents a cork or stopper for the filling-tube H.

The parts are assembled as follows: The amalgamated zinc electrode Z is placed in position against the inner surface of the jar, and then the completed inner electrode E is seated in position in the depression N at the bottom of the jar. The groove G is then filled with the wax O, after which the sealing cover or cork C is slipped into position, with the standards S and S' extending through their proper openings. The funnel-shaped tube R is now slipped into position in the oblong opening in the cover or cork C, with its lower end surrounding the standard S. The cap or cover L is then placed in position, with its central opening surrounding the standard S and the vent-tubes V V extending downward, as seen in Fig. 1 of the drawings. The entire cell is now sealed with wax P or with any other equivalent adhesive sealing medium and the binding-posts attached to the standards S S', after which the electrolyte is poured into the cell through the filling-tube H to a depth sufficient to cover the inner electrode E, as shown. The cork or stopper F is then secured in the filling-tube H and the cell is ready for use.

It will be apparent that by reason of the fact that the containing capacity of the cell is much greater than the amount of electrolyte or liquid used if the cell be turned upon its side there will be no escape, owing to the fact that the level of the liquid will be below the inner end of the funnel-shaped tube R. It will also be apparent that if the cell be turned upside down little or no liquid can escape, owing to the fact that the chamber around the funnel-shaped tube R is of sufficient capacity to accommodate all of the liquid. Should a small amount of liquid escape into the funnel-shaped tube R, it cannot pass out of the cell, owing to the fact that the vent-tubes V prevent such escape, and it will also be apparent that when the cell is righted or placed in proper position any such escaping liquid will be again returned to the interior thereof. The opening in the funnel-shaped tube R around the standard S and the small openings in the vent-tubes V will be sufficient to permit of the escape of any gas which may be generated within the cell.

In Figs. 3 and 4 I have shown a modified form of my improved sealing and venting means for battery-cells, the same consisting in this instance of three or more vent-tubes V of very small interior diameter, so located that should the battery be turned upon its side there will always be one or more of said vent-tubes with its inner end located above the level of the liquid, it being understood, as above, that the amount of the electrolyte or liquid should be only sufficient to fill the cell to such a depth that when it is turned upon its side none of it will escape through the tubes. I have discovered that where three or more such tubes are so arranged within a battery-cell good venting effects may always be obtained, owing to the fact that although some of the liquid may pass into any one of the tubes others will still be open for the passage of gas. The same effect is had with the funnel-shaped tube R, (shown in Fig. 1,) owing to the fact that when a drop of liquid is forced upward the increasing diameter of the tube permits the gas to escape on either side of said drop.

In Figs. 5 and 6 I have illustrated a modified means of securing the sealing cover or cork and the wax O for preventing the creeping of the liquids. In these two modifications the upper end of the battery-cell is simply provided with a flat ledge, and the groove G for retaining the wax O is in one instance in the outer edge of the cover or cork C and in the other in the lower face thereof, the same result being effected by this means as is effected by locating the groove in the jar itself, as shown in Fig. 1.

I have also illustrated more fully in Fig. 6 the relation of the standards S and S' to the sealing cover or cork C, funnel-shaped tube R, and attached parts.

I do not limit myself to the especial details of construction herein shown and described for effecting the result sought.

Having thus described my invention, what I claim, and desire to secure by Letters Patent of the United States, is—

1. A battery-cell embracing the following elements: a containing jar or vessel having an enlarged upper end provided internally with a grooved shoulder and means at the bottom of the vessel for holding or securing the lower end of one of the electrodes; in combination with a sealing-cover sustaining the upper end of said electrode and resting, when in position, upon the before-mentioned shoulder; together with a second electrode sustained against the inner surface of the jar or vessel; one or more vent-tubes extending through the cover and an adhesive medium located in the groove between the cover and the shoulder and adapted to effectually seal the upper end of the jar or vessel and secure all of said parts in permanent position, substantially as described.

2. A battery-cell embracing the following elements: a containing jar or vessel having an enlarged upper end provided internally with a shoulder and means at the bottom of the vessel for holding or securing the lower end of one of the electrodes; in combination with a sealing-cover sustaining the upper end of said electrode and resting, when in position, upon the before-mentioned shoulder; together with a second electrode sustained against the inner surface of the jar or vessel; one or more vent-tubes extending through the cover and an adhesive medium adapted to effectually seal the upper end of the jar or vessel and secure all of said parts in permanent position, the active part of the first-named electrode consisting of a series of lead disks threaded upon a standard, substantially as described.

3. A battery-cell having the following elements: a sealing-cover, an oblong funnel-shaped sealing-tube extending downwardly therethrough and secured thereto with its lower end near the axial center of the cell, said tube being provided with a sealing cover or cap and one or more vent-tubes secured thereto; together with two electrodes, one of which rests against the inner wall of the cell and the other of which is supported upon the bottom thereof with its conducting-standard extending upward through the sealing-tube and the cover or cap thereof and provided with a binding-post at its upper end, the second electrode extending upward through the sealing-cover and provided with a second binding-post and a sealing medium adapted to seal the upper surface of the cell.

4. A battery-cell having the following elements: a jar or vessel with a shoulder at its upper end and a groove therein filled with an adhesive wax not affected by the electrolyte; a sealing-cover resting upon said shoulder, a sealing-tube extending downwardly through said cover with its lower end located near the axial center of the cell, the upper end of said tube being provided with a cover or cap and one or more vent-tubes; two electrodes, one of which rests against the inner surface of the jar, the other being supported at the bottom thereof with its standard extending upward through the sealing-tube and secured in the cover or cap thereof; together with an electrolyte or exciting liquid, the surface level of which is below the lower end of the sealing-tube, and sealing means adapted to seal the upper surface of the cover and all of the adjacent parts.

In testimony whereof I have hereunto subscribed my name this 6th day of October, 1899.

DAVID H. DARLING, Jr.

Witnesses:
C. J. KINTNER,
A. F. VETTE.